(12) United States Patent
Harri

(10) Patent No.: US 6,788,690 B2
(45) Date of Patent: Sep. 7, 2004

(54) PACKET IDENTIFIER SEARCH FILTERING

(75) Inventor: Pekonen Harri, Raisio (FI)

(73) Assignee: Nokia Corporation, Espoo (FI)

(*) Notice: Subject to any disclaimer, the term of this patent is extended or adjusted under 35 U.S.C. 154(b) by 98 days.

(21) Appl. No.: 10/186,026

(22) Filed: Jun. 27, 2002

(65) Prior Publication Data

US 2004/0001488 A1 Jan. 1, 2004

(51) Int. Cl.[7] .............................................. H04L 12/28

(52) U.S. Cl. .................. 370/395.52; 370/419; 370/428; 370/432; 370/474; 370/475

(58) Field of Search ................................. 370/351, 357, 370/389, 395.52, 419, 428, 431, 432, 474, 475; 709/230, 231, 238; 725/151, 152

(56) References Cited

U.S. PATENT DOCUMENTS

| 5,224,152 | A | 6/1993 | Harte |
| 5,568,513 | A | 10/1996 | Croft et al. |
| 5,613,235 | A | 3/1997 | Kivari et al. |

FOREIGN PATENT DOCUMENTS

WO   WO 00/36861   6/2000

*Primary Examiner*—Hassan Kizou
*Assistant Examiner*—Dmitry Levitan
(74) *Attorney, Agent, or Firm*—Banner & Witcoff

(57) ABSTRACT

A broadband digital broadcast receiver and methods are provided for processing Internet protocol data. Transport stream packets are analyzed to determine whether they contain Internet protocol data addressed to a desired Internet protocol address. When a transport stream packet does contain the desired Internet protocol data, a transport stream filter is configured to filter additional transport stream packets according to a packet identifier value.

26 Claims, 3 Drawing Sheets

PACKET IDENTIFIER SEARCH FILTERING

The present application is related to U.S. patent application Ser. No. 10/083,795 filed Feb. 27, 2002 and entitled "Boolean Protocol Filtering."

BACKGROUND OF THE INVENTION

1. Field of the Invention

The invention relates to broadband digital transmission and reception. More particularly, the invention relates to the transmission and reception of Internet protocol packets on a broadband digital transmission network.

2. Description of Related Art

Digital broadband transmission networks are known. An example of such a network is that defined by the Advanced Television Systems Committee (ATSC). Another example of such a network enjoying popularity in Europe and elsewhere world-wide is Digital Video Broadcasting (DVB) which, like ATSC, in addition to the delivery of television content, is also capable of delivering data. Both ATSC and DVB utilize a containerization technique in which content for transmission is placed into MPEG-2 packets that act as data containers. Thus, the containers can be utilized to transport any suitably digitized data including, but not limited to High Definition TV, multiple channel standard definition TV (PAL/NTSC or SECAM) and, of course, broadband multimedia data and interactive services.

Conventionally, broadband digital transmission services transmit television content and data to end-users via transport streams. An example of such a transport stream used in ATSC and DVB is the MPEG-2 transport stream. Each transport stream contains individual transport stream packets identified by a packet identifier (PID). The PID contains the information required to locate, identify and reconstruct particular content or data in a receiver. A single transport stream typically contains transport stream packets identified by more than one packet identifier.

The processing of transport stream packets is time consuming and can have a significant impact on the performance of a broadband digital broadcast receiver. Such an impact on performance is accepted in the case of the delivery of more traditional television content. However, this is not the case in the provision of certain other types of service such as the delivery of Internet protocol packets that can carry audio, video, text, other data or any combination of them. A single Internet protocol packet is conventionally carried inside one datagram section. A datagram section is formed of one or more transport stream packet payload sections. Existing broadband digital broadcast receivers filter and process incoming transport stream packets to determine whether or not the transport stream packets contain payloads that are part of a desired Internet protocol packet. Although there have been some proposed solutions to reduce the number of transport stream packets filtered and processed by a broadband digital broadcast receiver, these solutions have involved using limitations of existing protocols to provide digital broadcast services. A significant drawback of these solutions is that they require modifying the hardware or software components and are incompatible with current standards.

Therefore, there exists a need in the art for apparatus, systems and methods for transmission and reception of services in which encapsulation of packets of the service results in the payload of those packets being distributed over one or more transport stream packets. More specifically, there exists a need for apparatus, systems and methods of transmission and reception of Internet protocol data over broadband digital broadcast service networks that require reduced processing by broadband digital broadcast receivers and that do not require extensive modifications to existing broadband digital broadcast receivers as well as increased speed in hand-over of the receivers moving between broadband digital broadcast base stations. Furthermore there is a need to link IP and DVB address information.

BRIEF SUMMARY OF THE INVENTION

One or more of the above-mentioned needs in the art are satisfied by the disclosed systems and methods that link the filtering of Internet protocol data to the filtering of transport stream packets.

In a first embodiment, a method for processing a digital broadband transmission at a receiver is provided. The method includes capturing a transport stream packet and analyzing the transport stream packet to detect a first identifier. When the first identifier is detected, second and third identifiers are detected. The second identifier is stored in a memory. Next, the third identifier is compared to a predetermined value. When the third identifier corresponds to the predetermined value, additional transport stream packets that include the second identifier are selected. Finally, a service with data carried in transport stream packets that include the second identifier is provided.

In another embodiment of the invention, a broadband digital broadcast receiver that processes Internet protocol packets that are transmitted as payloads of one or more transport stream packets containing packet identifiers is provided. The receiver includes a transport stream filter that filters transport stream packets according to packet identifiers and a decapsulation module coupled to the transport stream filter and that decapsulates Internet protocol data from transport streams. An address filter compares address information from the Internet protocol data to a desired Internet protocol address. A processor is programmed with computer-executable instructions to cause the receiver to perform the step comprising configuring the transport stream filter based on information received from the address filter.

In other embodiments of the invention, computer-executable instructions for implementing the disclosed methods are stored on computer-readable media.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
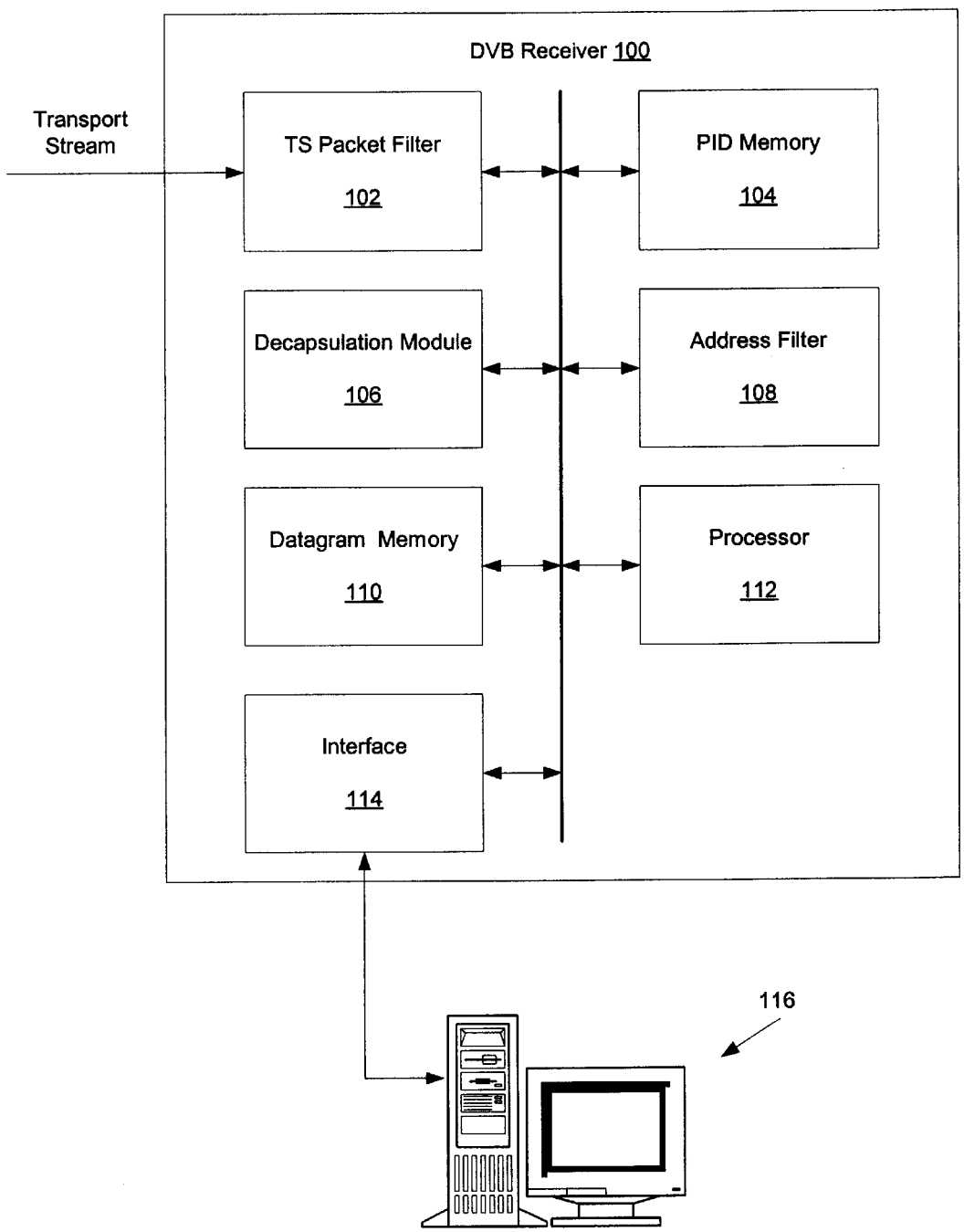
FIG. 1 shows a schematic diagram of a broadband digital broadcast receiver, in accordance with an embodiment of the invention.

FIG. 1 illustrates a broadband digital broadcast receiver 100 in accordance with an embodiment of the invention. Broadband digital broadcast receiver 100 may be implemented with a set top box, mobile telephone, personal digital assistant or other computer device. A transport stream packet filter 102 receives incoming transport stream packets. The transport stream may be a conventional MPEG-2 transport stream transmitted via a terrestrial network, cable network, a satellite network or any other conventional broadband digital broadcasting network. In one embodiment of the invention a transport stream packet filter 102 filters transport stream packets based on packet identifier values.

A packet identifier (PID) memory 104 may be included to store packet identifier values of incoming transport stream packets. The use of packet identifier values will become apparent from the description given below. A decapsulation module 106 may be included to decapsulate transport stream packets. In one embodiment, Internet protocol data is delivered using the Internet protocol over multiprotocol encapsulation DVB data broadcasting profile. The present invention may be practiced with a variety of different encapsulation methods, including IP/MPE/DSM-CC_section/MPEG2 (MPE—Multiprotocol Encapsulatiom DSM-CC Digital Storage Media—Command and Control standard for the delivery of multimedia broadband services) transport stream encapsulation and proprietary encapsulation methods. Alternative encapsulation methods include IP/"proprietary encapsulation1"/PES/MPEG-2 (PES—Packetized Elementary Stream) for DVB data streaming, IP/"proprietary encapsulation2"/MPEG-2 for DVB data piping and IP/"proprietary encapsulation3"/MPEG-2 for MPEG network (e.g. inc. ATSC). Encapsulation is done in the headend.

A terminal may identify an IP address beforehand e.g. through an electronic service guide. The terminal could retrieve the electronic service guide through a communication path determined by the terminal capability. For example, a user may retrieve the electronic service guide through the broadcast path. After the terminal has received the electronic service guide, the service the user of terminal is desiring is selected and the IP address or the like address information of this service may be stored in an address filter 108. Address filter 108 may be included to filter Internet protocol addresses, MAC address bytes or other address information. In one aspect of the invention, address filter 108 filters address information of Internet protocol packets. A datagram memory 110 may be included to store one or more Internet protocol packet sections. A processor 112 may be included to control the overall operation of digital broadcast receiver 100. Of course, processor 112 may be programmed with computer executable instructions. Finally, an interface 114 may be included to couple digital broadcast receiver 100 to an external computer device 116. A single computer device 116 is shown for illustration purposes only. In other embodiments, interface 114 may be coupled to a network, several computer devices, a single computer device having several Internet protocol addresses or any hardware device programmed to include at least one Internet protocol address, mobile telephone, personal digital assistant, set top box or the like.

Figure 2:
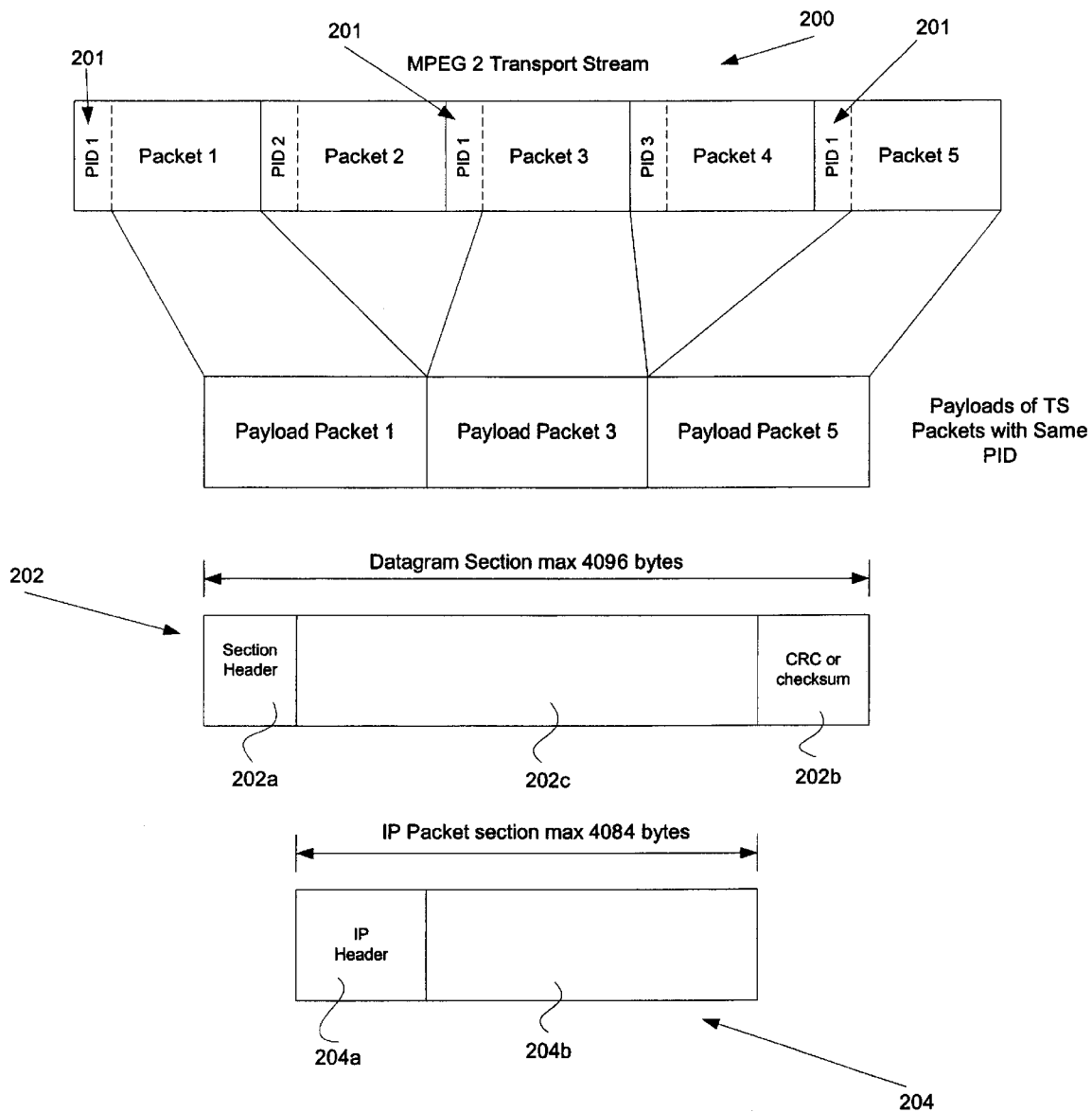
FIG. 2 shows how Internet protocol data is carried by transport stream packets, in accordance with an embodiment of the invention.

Before describing a method of implementing aspects of the present invention, the transmission of Internet protocol packets via digital broadcast networks will be described with reference to FIG. 2. An MPEG-2 transport stream 200 includes several transport stream packets. Each transport stream packet is identified by a packet identifier value. As is shown in FIG. 2, several different transport stream packets may be identified by the same packet identifier value. Packet identifier values are typically used to identify services transmitted as part of a digital broadcast compliant transport stream, such as a DVB component. As part an embodiment of the present invention, a packet identifier value may correspond to an individual or a group of Internet protocol addresses. For example, a single packet identifier value may correspond to a group of Internet protocol addresses to reduce the requirement for unique packet identifier values.

Figure 3:
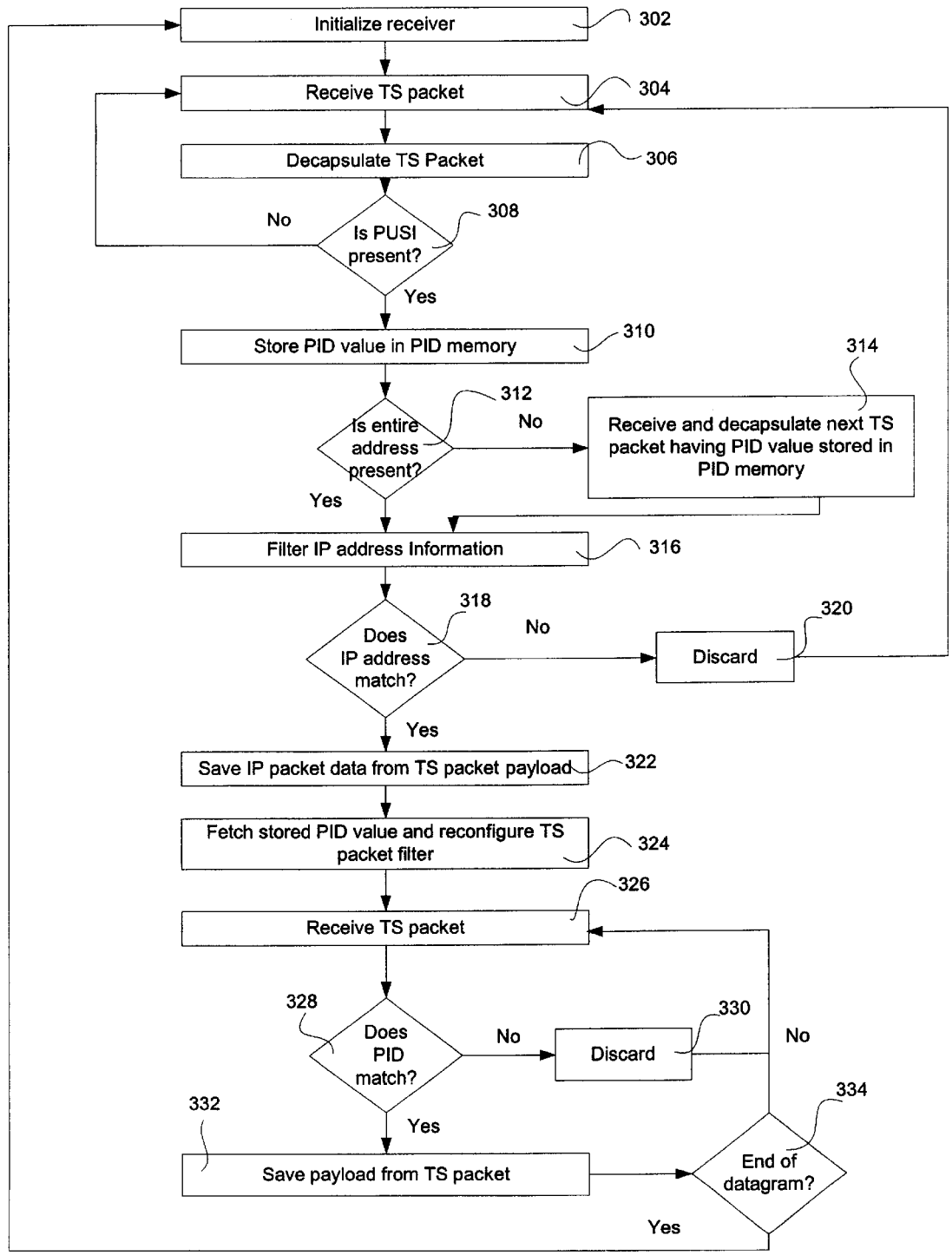
FIG. 3 illustrates a method of filtering transport stream packets according to encapsulated Internet protocol data, in accordance with an embodiment of the invention.

FIG. 2 shows that the payloads of transport stream packets with the same packet identifiers 201 may be grouped together in a datagram section 202 in the receiver. Datagram section 202 includes a section header 202a, IP packet section 202c and CRC or checksum bits 202b. The section header 202a may include MAC or other relevant identifiable information. In one aspect of the invention, datagram section 202 is limited to a maximum size of 4096 bytes. The IP packet section 202c may comprise IP header 204a and payload 204b, and be formatted in accordance with IPv4, IPv6 or any other format. The IP packet section 202c may be limited to the conventional maximum size of 4084 bits. The payloads 204b can then be presented to the user using his or her terminal. FIG. 3 illustrates a method of filtering transport stream packets according to encapsulated Internet protocol data, in accordance with an embodiment of the invention. First, in step 302, a broadband digital broadcast receiver is initialized. The initialization step may include resetting a state of a transport stream packet filter. Next, in step 304 the broadband digital broadcast receiver receives a transport stream packet. In step 306, the transport stream packet may be decapsulated to reveal underlying Internet protocol data. The decapsulation operation will be a function of the encapsulation format. Next, in step 308, the transport stream packet may be analyzed to determine whether a payload unit start indicator (PUSI) is present. When a payload unit start indicator is present, in step 310 the packet identifier value of the transport stream packet is stored in a packet identifier memory, such as PID memory 104. A stored packet identifier value may be used for later transport stream packet filtering. When a payload unit start indicator is not present, control may be transferred to step 304.

It is determined whether the entire address information is present in step 312. A single transport stream packet may contain only a portion of a MAC or IP address. When the entire address is not present, in step 314 the broadband digital broadcast receiver may receive and decapsulate additional transport stream packet until the complete address information is available. Alternatively, the portion of the IP address that is present may be filtered. In some cases, only a portion of the address is needed.

Address information of the underlying Internet protocol data is filtered in step 316. One skilled in the art will appreciate that Internet protocol address information may include an Internet protocol packet destination address or an Internet protocol packet source address. Moreover, as used herein, "Internet protocol address information" may also include MAC address bits that contain address information.

Aspects of the present invention may be used in connection with Internet protocol multicast and unicast services. With Internet protocol multicast services, Internet protocol destination address information is typically copied to datagram section header MAC address bits. The filtering of step 316 may be performed by filtering the Internet protocol destination address or by filtering MAC address bits from the datagram section header 202a. With Internet protocol unicast services, the receiver's MAC address may be delivered to a headend transmitter by means of the operator or service provider. The address may be transferred through another communication path through. The communication path may include phone messaging services like Short Message Service (SMS) in GSM, sending messages including the MAC address to a predetermined number of an administrator operating this kind of service and having access to the transport stream encapsulation. The headend transmitter may then copy the MAC address to transport stream packets as identifiers of the transport stream packets sent to receivers. The filtering of step 316, may be performed by filtering the MAC bits. At the headend the broadcast operator decides this PID to IP mapping. In the case of Digital Video Broadcasting - Terrestrial (DVB-T) handover, the receiver wants to receive the same IP service. Example of this could be unicast services. In the case of a unicast service, a MAC address of the receiver may be used for filtering. The MAC address is unique inside the network. When the receiver enters a new cell, the same IP service may be transmitted with a different PID value. In that case, filtering the MAC address becomes much faster than determining a new PID value from metadata. As a result, handover is much faster.

In step 318 it is determined whether the underlying Internet protocol address information matches a desired Internet protocol address. The desired Internet protocol address may correspond to the Internet protocol address of computer device 116 shown in FIG. 1. When the Internet protocol address information does not match the desired address, in step 320 the data is discarded. After step 320, control returns to step 304.

When the Internet protocol address information does match the desired address, in step 322 the IP packet data from the transport stream is saved. The payloads of several transport stream packets may be combined to create a single Internet protocol packet. Next, in step 324, the stored packet identifier value may be fetched and used to reconfigure the transport stream filter. In step 326, the broadband digital broadcast receiver receives another transport stream packet. Once the transport stream packet filter has been reconfigured to filter transport stream packets according to packet identifier values, incoming Internet protocol data included within transport stream packets may be filtered according to packet identifier values, as opposed to Internet protocol address information. In particular, in step 328 the packet identifier value of the received transport stream packet is compared to the packet identifier value stored in the PID memory. When the packet identifier does not match, the transport stream packet is discarded in step 330. After step 330, control may return to step 326. One skilled in the art will appreciate the efficiencies realized from filtering incoming transport stream packets according to packet identifier values. As an example, the decapsulating of step 306 and the address filtering of step 316 are not required.

When the packet identifier values do match, in step 332 the payload from the transport stream packet is stored in a memory. As stated above, the payloads of plural transport stream packets may be combined to create a single Internet protocol packet. Finally, in step 334 it is determined whether or not the received transport stream packet is the end of the datagram. When the transport stream packet is not the end of the datagram, control returns to step 326 where the digital broadcast receiver receives another transport stream packet. When the transport stream packet is the end of the datagram, control returns to step 302 where the receiver is initialized. The end of a datagram may be identified by a multiprotocol header including an indication of the length of the datagram. The multiprotocol header is sent in the first transport stream packet. The receiver may analyze the received information to determine the size of the datagram and when the end of the datagram has been reached. In an alternative embodiment, after a first Internet protocol packet has been received with some packet identifier value, that packet identifier value is used going forward.

The embodiment shown in FIG. 3 filters transport stream packets for a single packet identifier value. One skilled in the art will appreciate that a transport stream packet filter may be configured to filter transport stream packets for more than one packet identifier value. For example, several devices having separate Internet protocol addresses may be coupled to a single broadband digital broadcast receiver. A transport stream packet filter may be configured to filter according to packet identifier values corresponding to the separate Internet protocol addresses. In one implementation that includes the filtering of data for more than one Internet protocol address, after steps 326 and 330, control returns to step 304. Steps 314 and 324 may also involve comparisons to more than one Internet protocol address information value or packet identifier value.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, aspects of the present invention may be used with digital audio broadcast services and other digital or data systems. One skilled in the art will also appreciate that the method shown in FIG. 3 is merely illustrative of one particular implementation of aspects of the present invention. The orders of several the steps shown in FIG. 3 may be rearranged. Moreover, several of the steps may be combined.

We claim:

1. A method for processing a digital broadband transmission at a receiver, the method comprising:
   (a) capturing a transport stream packet;
   (b) analyzing the transport stream packet to detect a first identifier;
   (c) when the first identifier is detected, identifying a second identifier and a third identifier of the transport stream packet;
   (d) storing the second identifier in a memory;
   (e) comparing the third identifier to a predetermined value,
   (f) when the third identifier corresponds to the predetermined value, selecting additional transport stream packets that include the second identifier; and
   (g) providing a service with data carried in transport stream packets that include the second identifier.

2. The method of claim 1, further including decapsulating the transport stream packet.

3. The method of claim 1, further including storing the second identifier for later use by the receiver when the first identifier corresponds to a predetermined value.

4. The method of claim 1, wherein the first identifier comprises a payload unit start indicator and the second identifier comprises a packet identifier value.

5. The method of claim 1, wherein (f) comprises:
   (i) fetching the packet identifier value from the memory;
   (ii) decapsulating the additional transport stream packets that include the second identifier; and
   (iii) storing in a datagram memory payloads of the additional transport stream packets that include the second identifier.

6. The method of claim 1, wherein the third identifier comprises Internet protocol address information.

7. The method of claim 6, further including storing in a datagram memory Internet protocol data carried in the transport stream packets that include the second identifier.

8. A method of processing transport stream packets containing Internet protocol payloads, the method comprising:

(a) analyzing at a transport stream packet filter a first transport stream packet containing a first packet identifier value;

(b) detecting at an address filter Internet protocol address information contained in the first transport stream packet; and (c) when the detected Internet protocol address information corresponds to a desired address, configuring the transport stream packet filter to filter additional transport stream packets according to the first packet identifier value.

9. The method of claim 8, wherein (a) comprises:

(i) determining whether the first transport stream packet contains a payload unit start indicator; and (ii) when the first transport stream packet contains a payload unit start indicator, storing the first packet identifier value in a memory.

10. The method of claim 9, wherein (c) comprises transmitting from the memory to the transport stream packet filter the first packet identifier value.

11. The method of claim 8, further including:

(d) receiving at the transport stream packet filter a second transport stream packet containing a second packet identifier value; and (e) discarding the second transport stream packet when the second packet identifier value does not correspond to the first transport stream packet identifier value.

12. The method of claim 8, wherein (b) comprises decapsulating the first transport stream packet.

13. The method of claim 8, further including:

(d) receiving a second transport stream packet having a packet identifier value that corresponds to the first packet identifier value;

(e) determining whether the second transport stream packet contains a last section of an Internet protocol packet having the desired address; and (f) when the second transport stream packet contains the last section of an Internet protocol packet, resetting a state of the transport stream packet filter.

14. The method of claim 8, wherein the desired address information comprises a destination address.

15. The method of claim 8, wherein the desired address information comprises a source address.

16. The method of claim 8, wherein the desired address information comprises a MAC address.

17. The method of claim 8, wherein the transport stream filter is part of a broadband digital broadcast receiver.

18. The method of claim 8, further including transmitting to a computer device data included in the first transport stream packet.

19. The method of claim 8, wherein the desired address corresponds to an Internet protocol address of the computer device.

20. The method of claim 8, wherein the desired address corresponds to a MAC address of the computer device.

21. The method of claim 20, further including:

(d) transmitting to a source of the transport stream packets the MAC address of the computer device.

22. A broadband digital broadcast receiver that processes Internet protocol packets that are transmitted as payloads of one or more transport stream packets containing packet identifiers, the receiver comprising:

a transport stream filter that filters transport stream packets according to packet identifiers;

a decapsulation module coupled to the transport stream filter and that decapsulates Internet protocol data from transport streams;

an address filter that compares address information from the Internet protocol data to a desired Internet protocol address;

a processor programmed with computer-executable instructions to cause the receiver to perform the step comprising:

configuring the transport stream filter based on information received from the address filter.

23. The broadband digital broadcast receiver of claim 22, wherein the information received from the address filter comprises an indication of whether the address information corresponds to the desired Internet protocol address.

24. The broadband digital broadcast receiver of claim 22, further including a memory coupled to the transport stream filter that stores packet identifier values.

25. A mobile receiver that processes Internet protocol packets that are transmitted as payloads of one or more transport stream packets containing packet identifiers, the receiver comprising:

a transport stream filter that filters transport stream packets according to packet identifiers;

a decapsulation module coupled to the transport stream filter and that decapsulates Internet protocol data from transport streams;

an address filter that compares address information from the Internet protocol data to a desired Internet protocol address;

a processor programmed with computer-executable instructions to cause the receiver to perform the step comprising:

configuring the transport stream filter based on information received from the address filter.

26. A computer readable-medium containing computer-executable instructions for causing a broadband digital broadcast receiver to perform the steps comprising:

(a) analyzing at a transport stream packet filter a first transport stream packet containing a first packet identifier value;

(b) detecting at an address filter Internet protocol address information contained in the first transport stream packet; and (c) when the detected Internet protocol address information corresponds to a desired address, configuring the transport stream packet filter to filter additional transport stream packets according to the first packet identifier value.

* * * * *

UNITED STATES PATENT AND TRADEMARK OFFICE
CERTIFICATE OF CORRECTION

PATENT NO. : 6,788,690 B2
DATED : September 7, 2004
INVENTOR(S) : Harri Pekonen

It is certified that error appears in the above-identified patent and that said Letters Patent is hereby corrected as shown below:

Title page,
Item [75], Inventor, should read -- Harri Pekonen, Raisio (FI) --

Signed and Sealed this

Twenty-first Day of December, 2004

JON W. DUDAS
*Director of the United States Patent and Trademark Office*